(12) United States Patent
Uno

(10) Patent No.: US 10,569,576 B2
(45) Date of Patent: Feb. 25, 2020

(54) PRINTER AND RECORDING MEDIUM

(71) Applicant: BROTHER KOGYO KABUSHIKI KAISHA, Nagoya-shi, Aichi (JP)

(72) Inventor: Masaru Uno, Toyokawa (JP)

(73) Assignee: BROTHER KOGYO KABUSHIKI KAISHA, Nagoya-shi, Aichi-ken (JP)

(*) Notice: Subject to any disclaimer, the term of this patent is extended or adjusted under 35 U.S.C. 154(b) by 95 days.

(21) Appl. No.: 15/713,062

(22) Filed: Sep. 22, 2017

(65) Prior Publication Data

US 2018/0093508 A1    Apr. 5, 2018

(30) Foreign Application Priority Data

Sep. 30, 2016  (JP) ................. 2016-194223

(51) Int. Cl.
*B41J 15/04*   (2006.01)
*B41J 29/02*   (2006.01)
(Continued)

(52) U.S. Cl.
CPC ............ *B41J 15/04* (2013.01); *B41J 11/007* (2013.01); *B41J 11/008* (2013.01); *B41J 11/04* (2013.01);
(Continued)

(58) Field of Classification Search
CPC ........ B41J 15/04; B41J 11/007; B41J 11/008; B41J 11/04; B41J 11/42; B41J 11/70; B41J 29/02; B41J 11/66; B41J 13/103; B41J 29/13; B41J 29/38; G06F 3/12
See application file for complete search history.

(56) References Cited

U.S. PATENT DOCUMENTS 4,990,965 A * 2/1991 Kiya ............... G03G 15/23
271/186
2003/0011800 A1* 1/2003 Miyahara ........... H04N 1/32122
358/1.13
(Continued)

FOREIGN PATENT DOCUMENTS

JP  2003-141639 A   5/2003
JP  2005-319740 A   11/2005
(Continued)

OTHER PUBLICATIONS

Japanese Notice of Reasons for Refusal dated Nov. 28, 2019 received in Japanese Patent Application No. 2016-194223, together with an English-language translation.

*Primary Examiner* — David H Banh
(74) *Attorney, Agent, or Firm* — Scully, Scott, Murphy & Presser, P.C.

(57) ABSTRACT

The disclosure discloses a printer including a memory that stores computer-executable instructions. When the instructions executed by a processor, printer performs an image expansion process, a reverse feeding process, and a printing process. In the image expansion process, image data corresponding to a print command analyzed by an analysis process is expanded. In the reverse feeding process, a feeder feeds a print-receiving medium in the reverse direction to move a tip of the print-receiving medium positioned in a vicinity of a cutting blade of a cutter in the reverse direction. In the printing process, the feeder and the printing head operate to form a print on a basis of the image data expanded in an image buffer. The printer executes the image expansion process and the reverse feeding process in parallel to each other when the instructions are executed by the processor.

8 Claims, 12 Drawing Sheets

(51) Int. Cl.
*B41J 11/42* (2006.01)
*B41J 11/00* (2006.01)
*B41J 11/70* (2006.01)
*B41J 11/04* (2006.01)
*B41J 11/66* (2006.01)
*B41J 13/10* (2006.01)
*B41J 29/13* (2006.01)
*B41J 29/38* (2006.01)
*G06F 3/12* (2006.01)

(52) U.S. Cl.
CPC ............... *B41J 11/42* (2013.01); *B41J 11/70* (2013.01); *B41J 29/02* (2013.01); *B41J 11/66* (2013.01); *B41J 13/103* (2013.01); *B41J 29/13* (2013.01); *B41J 29/38* (2013.01); *G06F 3/12* (2013.01)

(56) References Cited

U.S. PATENT DOCUMENTS

| | | | |
|---|---|---|---|
| 2003/0086740 | A1 | 5/2003 | Miyajima |
| 2011/0205277 | A1 | 8/2011 | Hiroike |
| 2013/0308970 | A1* | 11/2013 | Sato .................. G03G 15/5004 399/50 |
| 2014/0152753 | A1* | 6/2014 | Moriyama ............. B41J 11/009 347/110 |
| 2014/0225972 | A1 | 8/2014 | Kanda et al. |
| 2015/0246567 | A1* | 9/2015 | Kawai ........................ B41J 2/32 347/218 |

FOREIGN PATENT DOCUMENTS

| | | |
|---|---|---|
| JP | 2011-101987 A | 5/2011 |
| JP | 2014-151604 A | 8/2014 |
| JP | 2016-112826 A | 6/2016 |

* cited by examiner

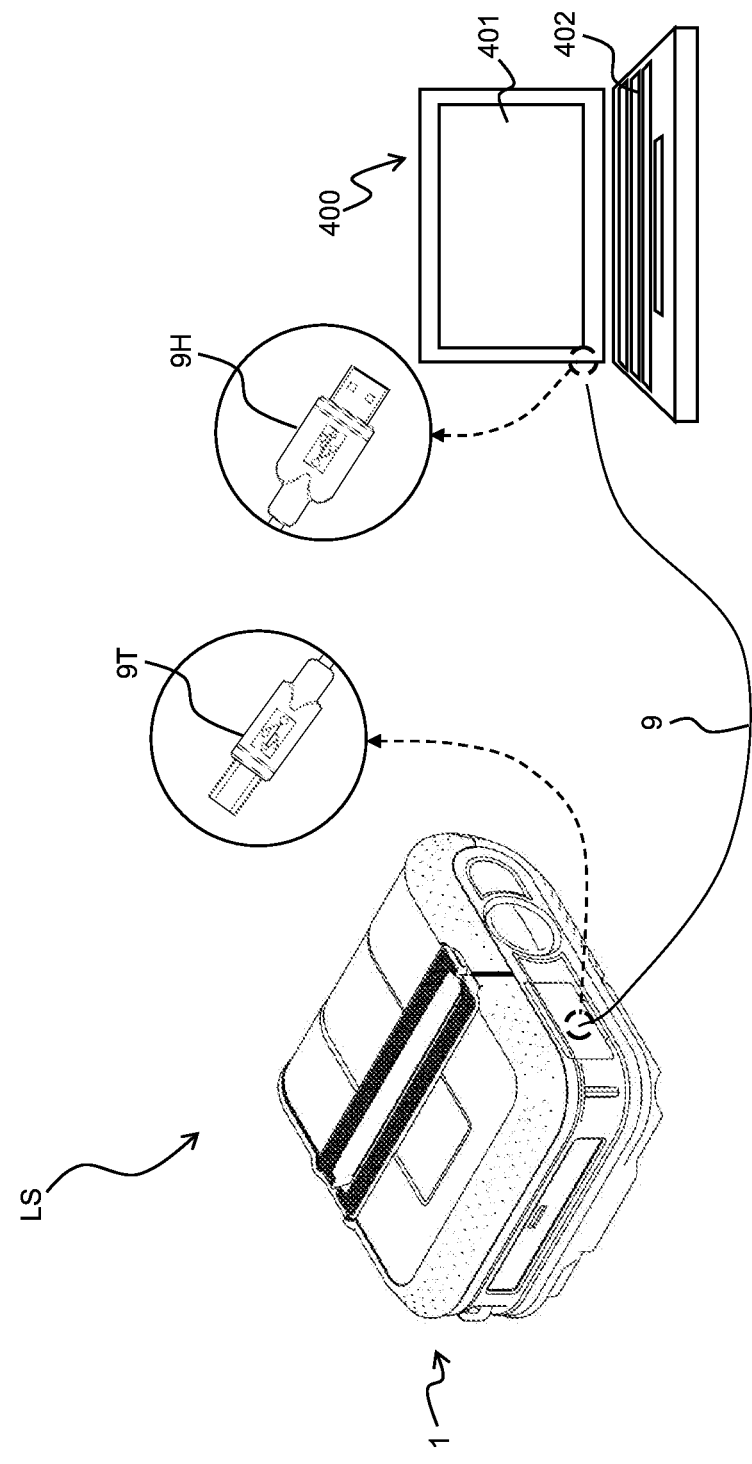
[FIG. 1]

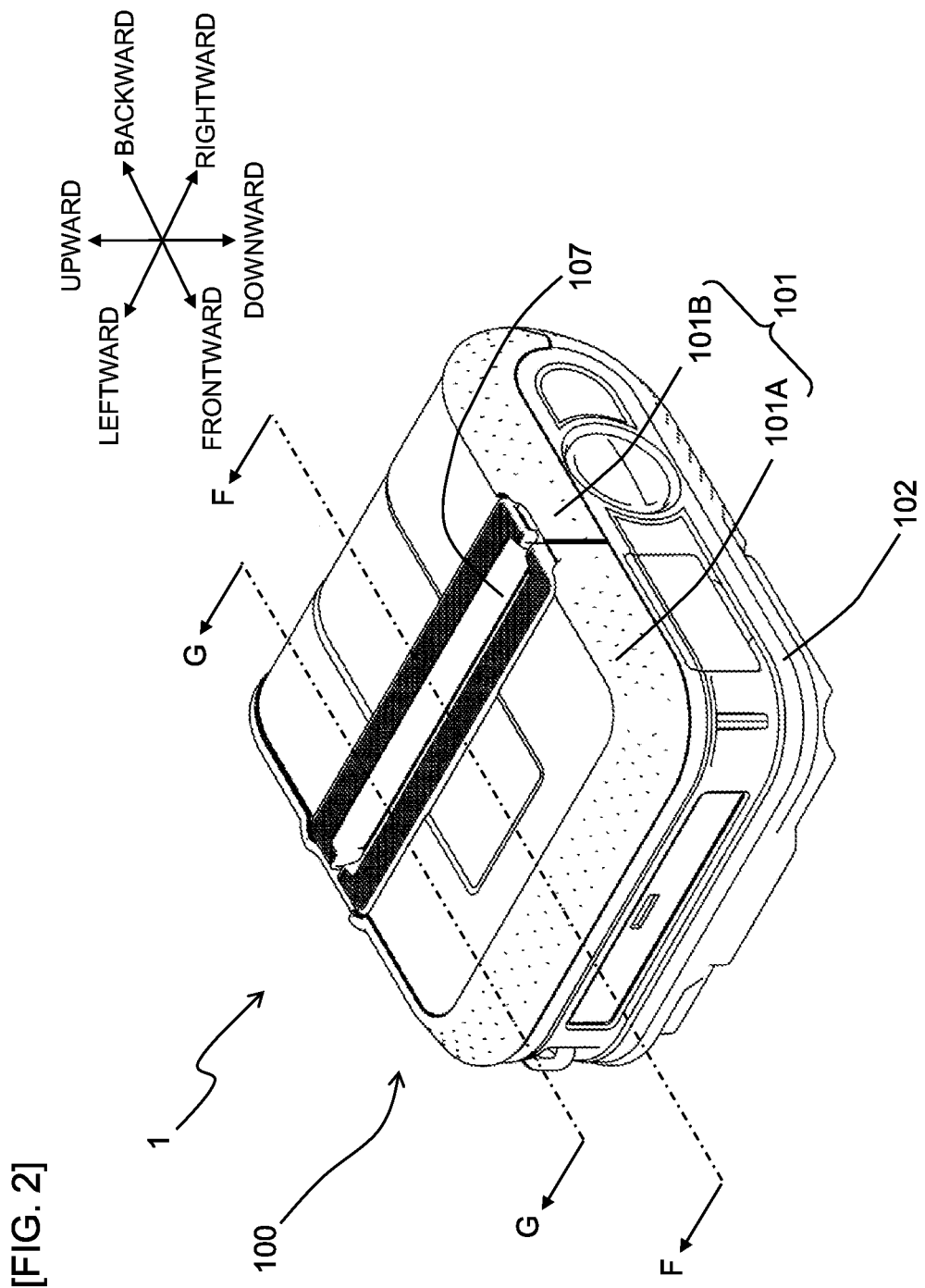

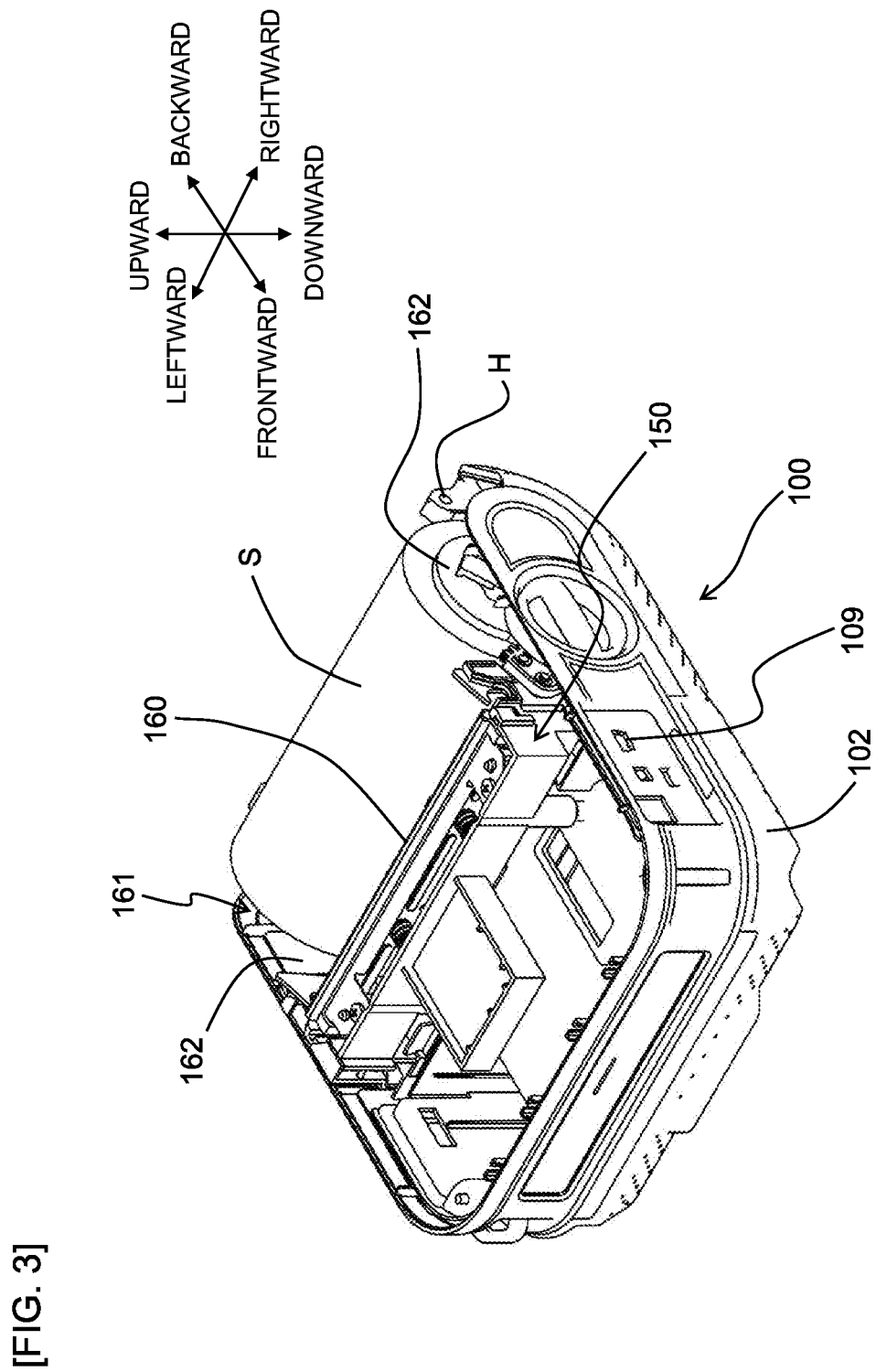

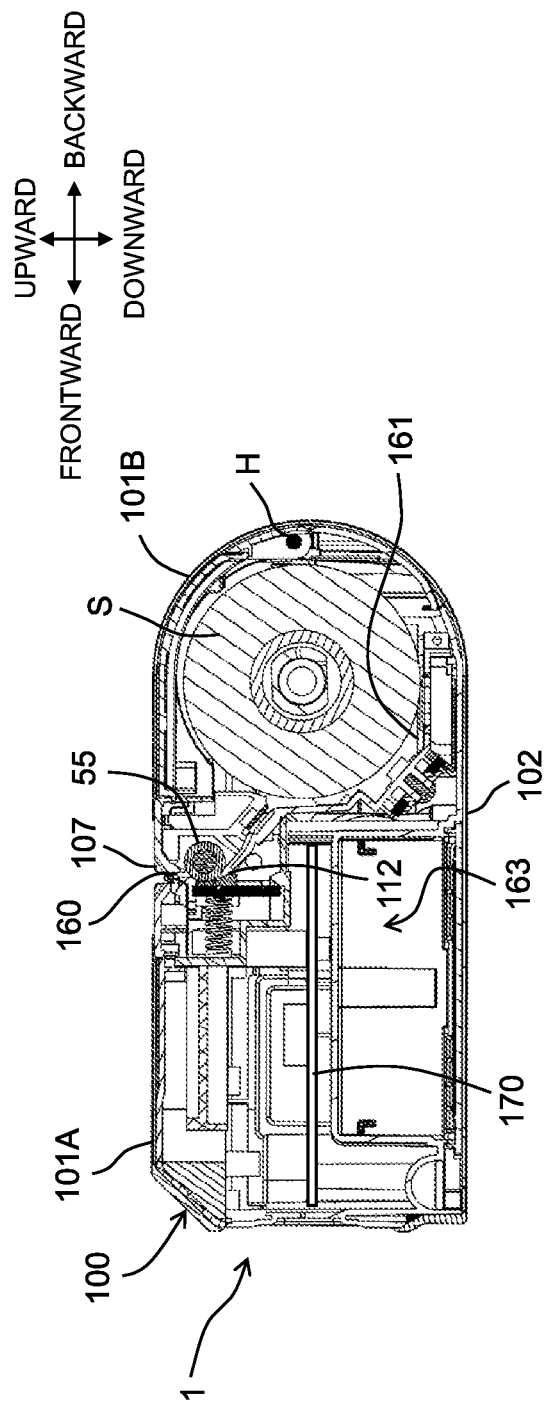
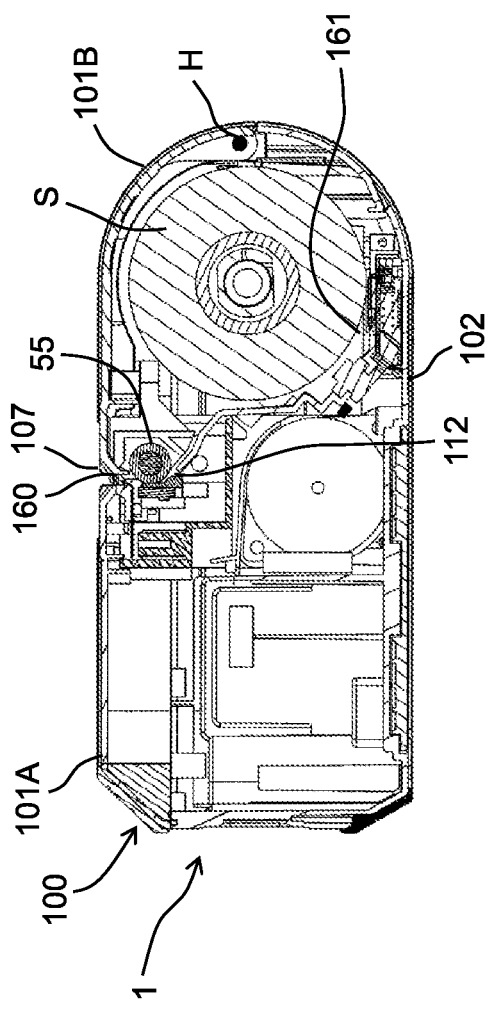

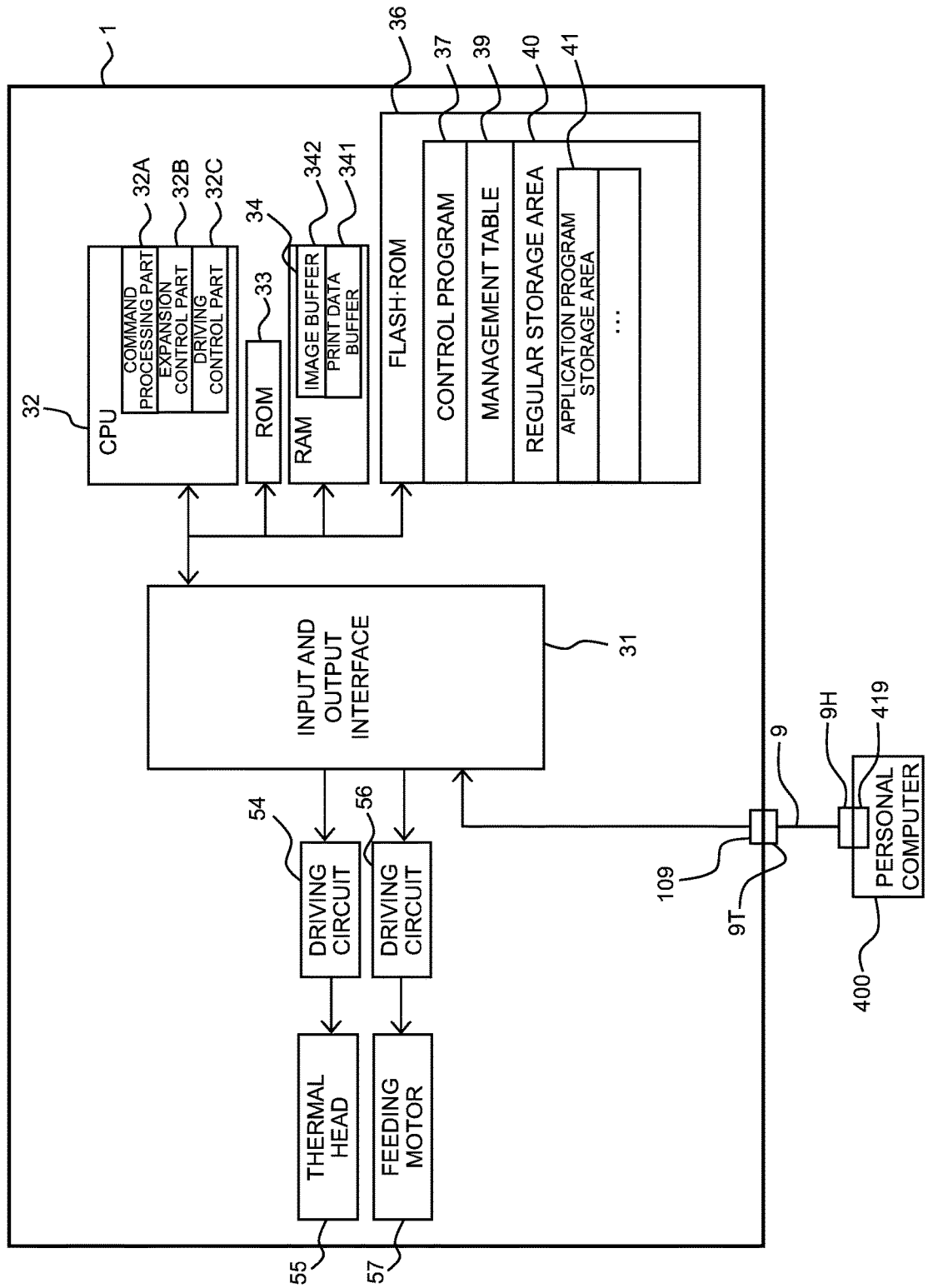

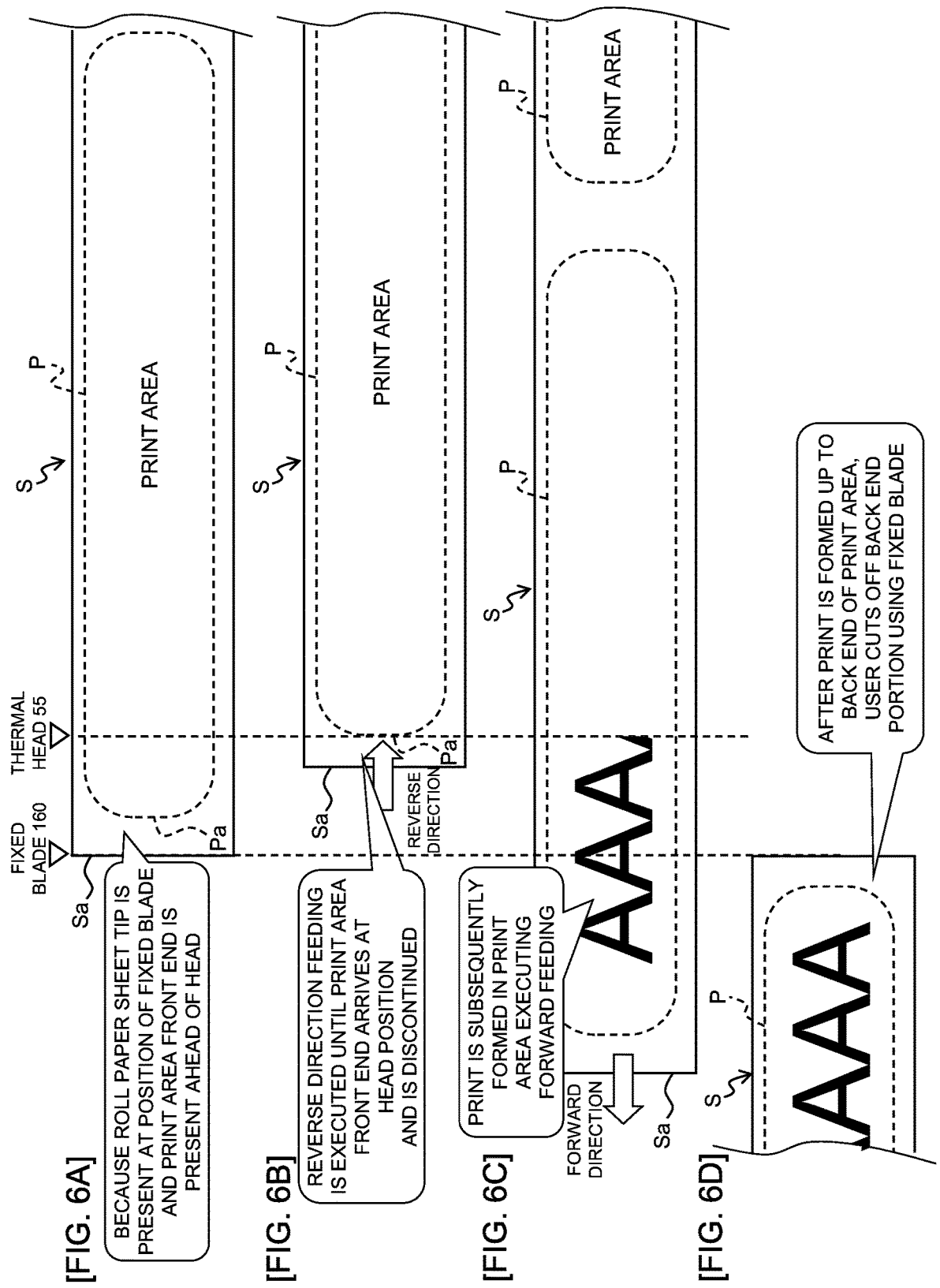

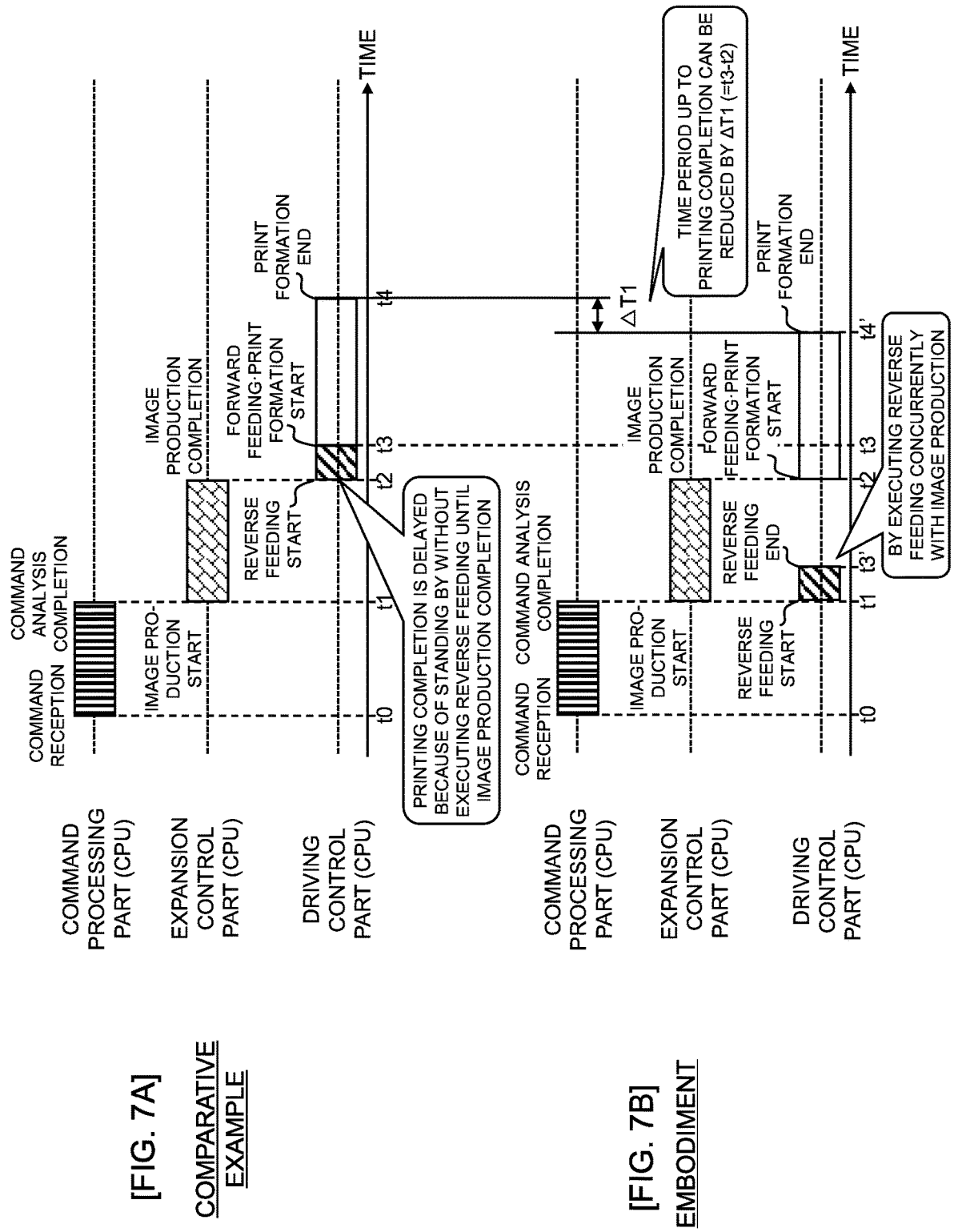

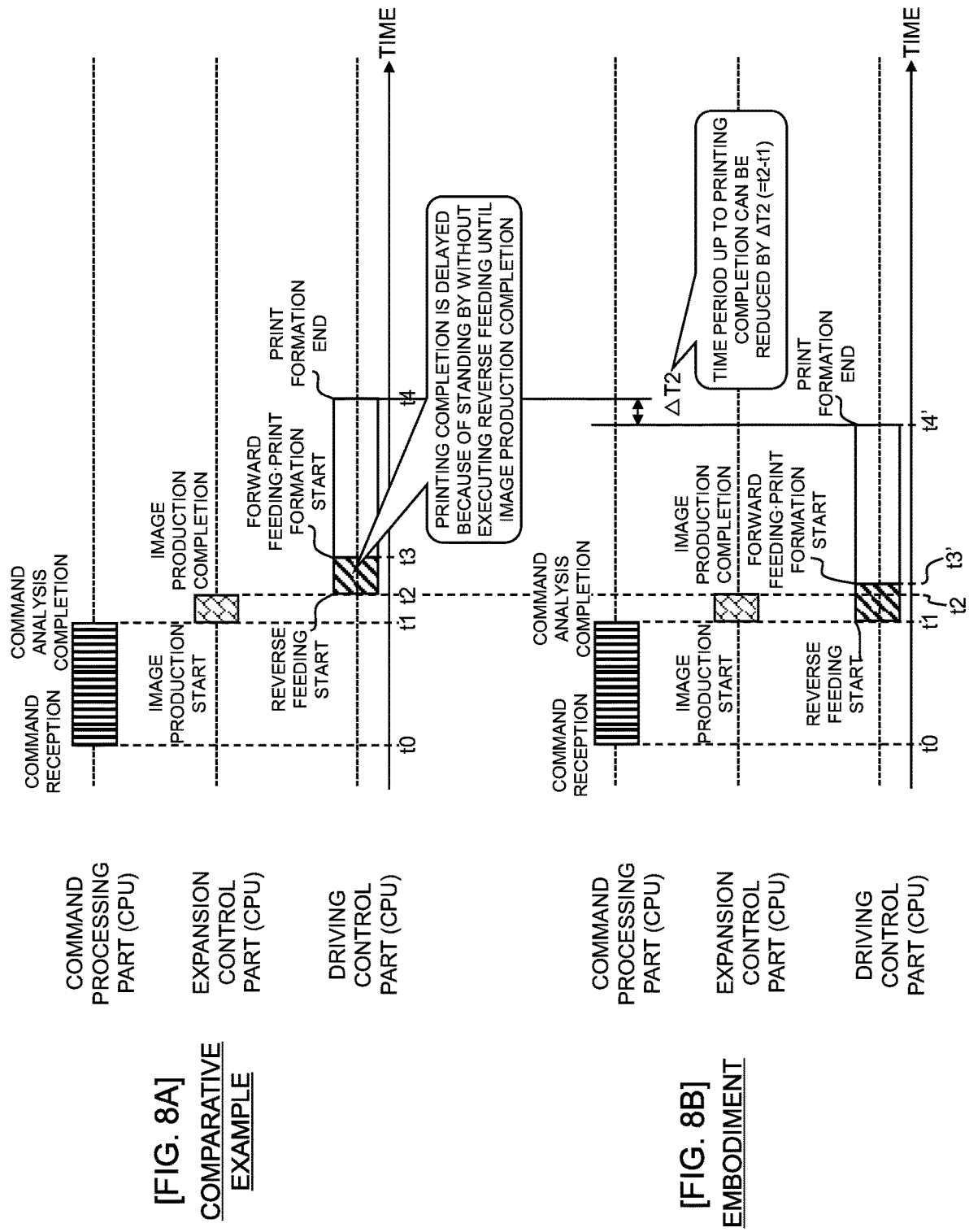

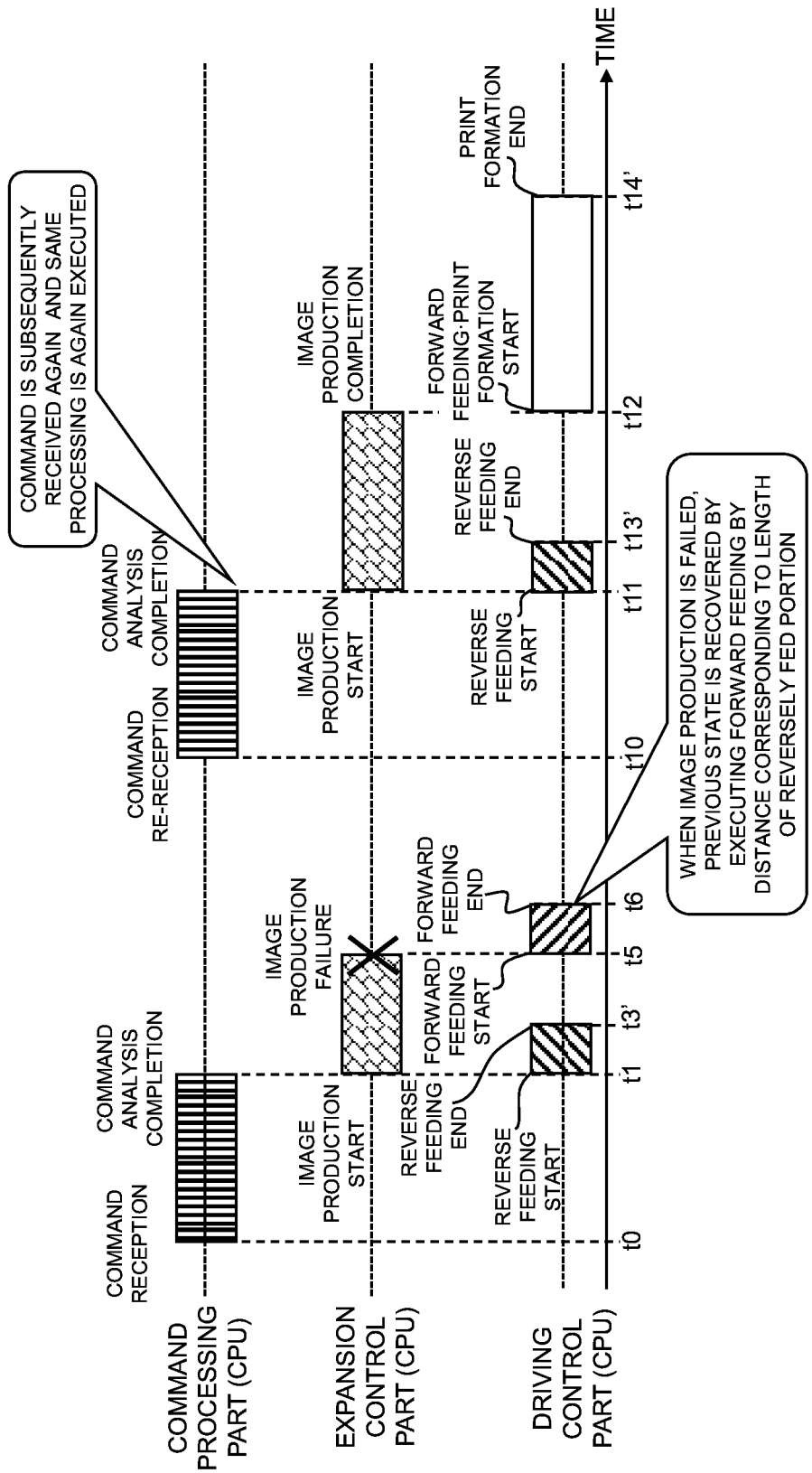

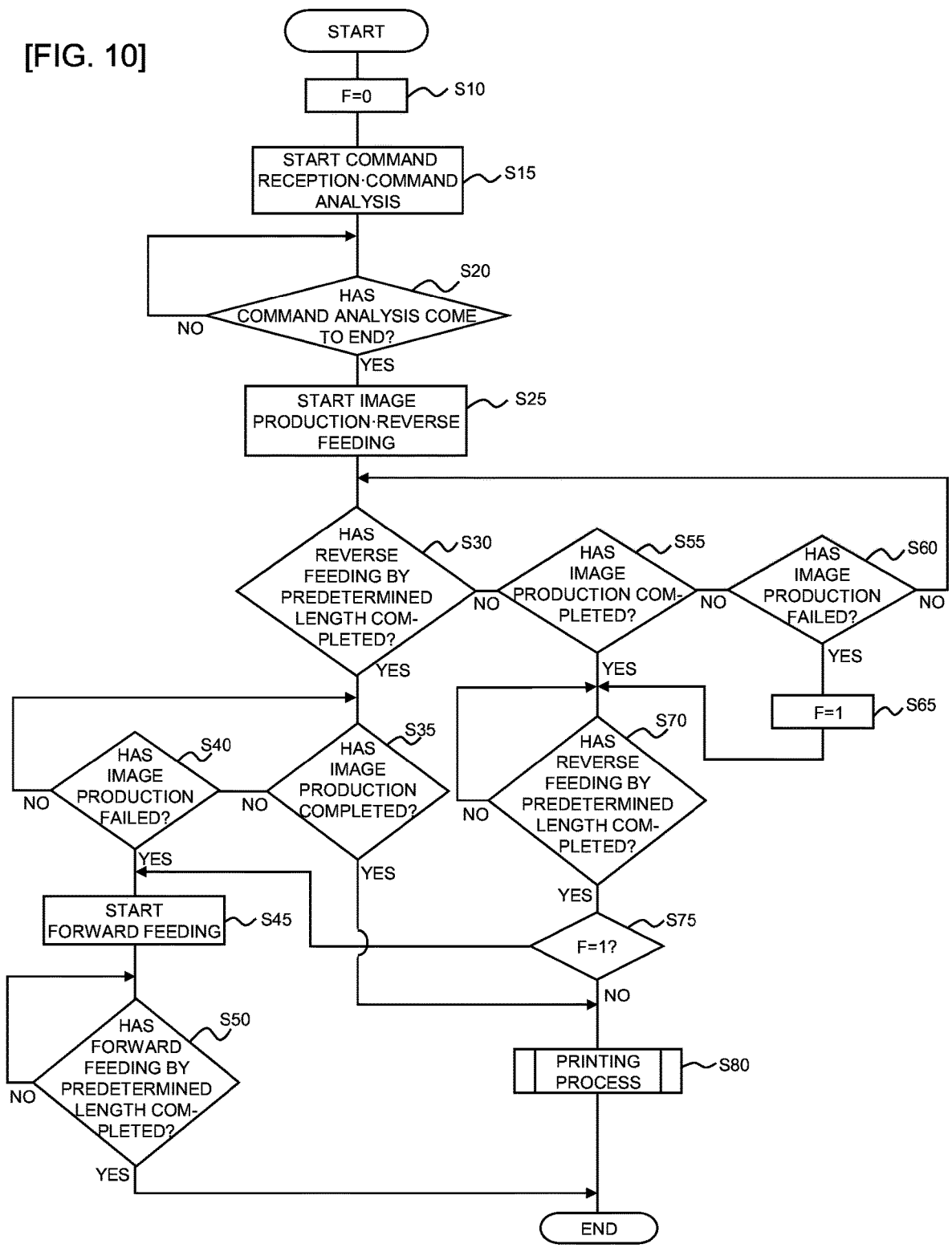
[FIG. 10]

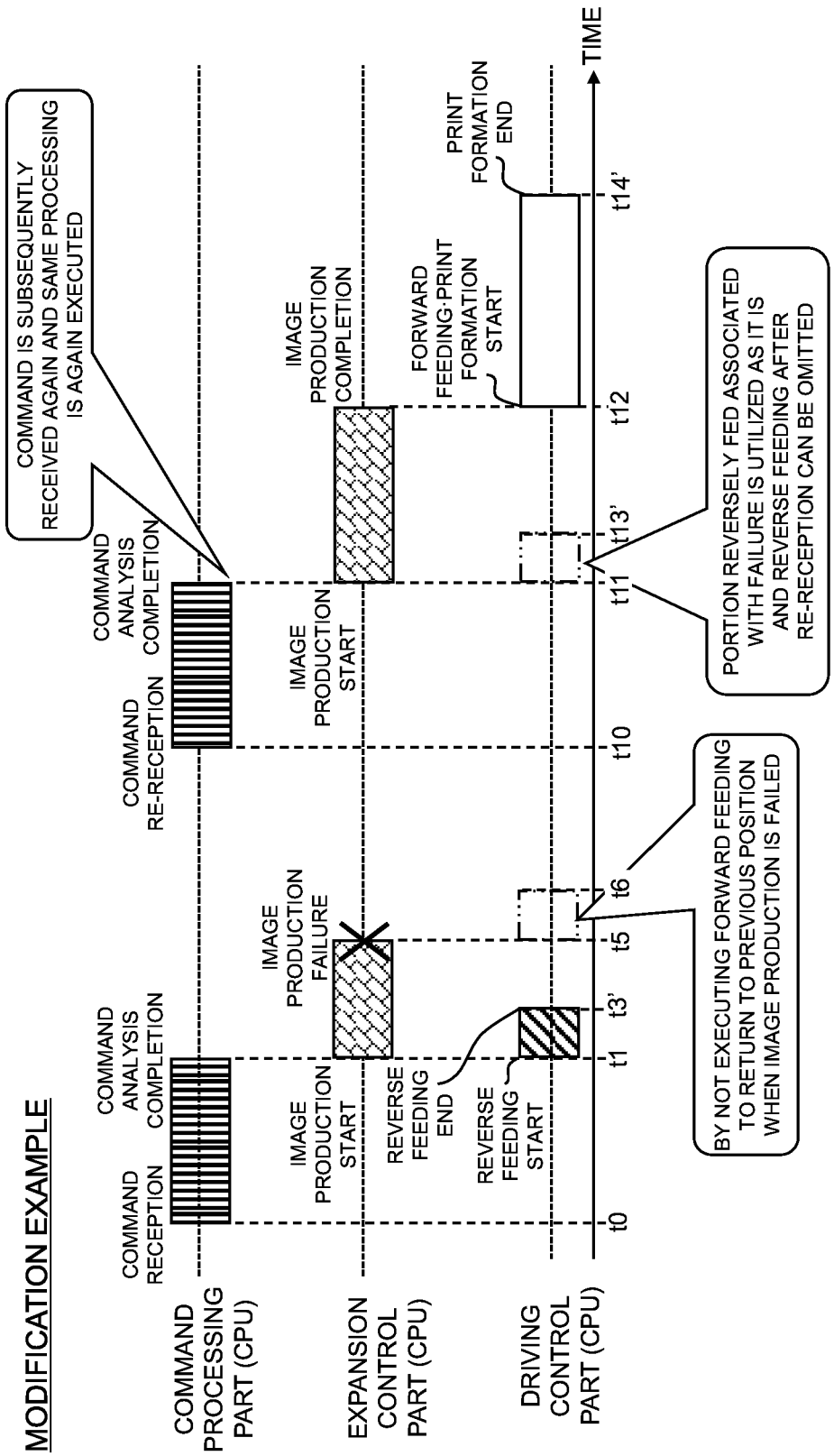

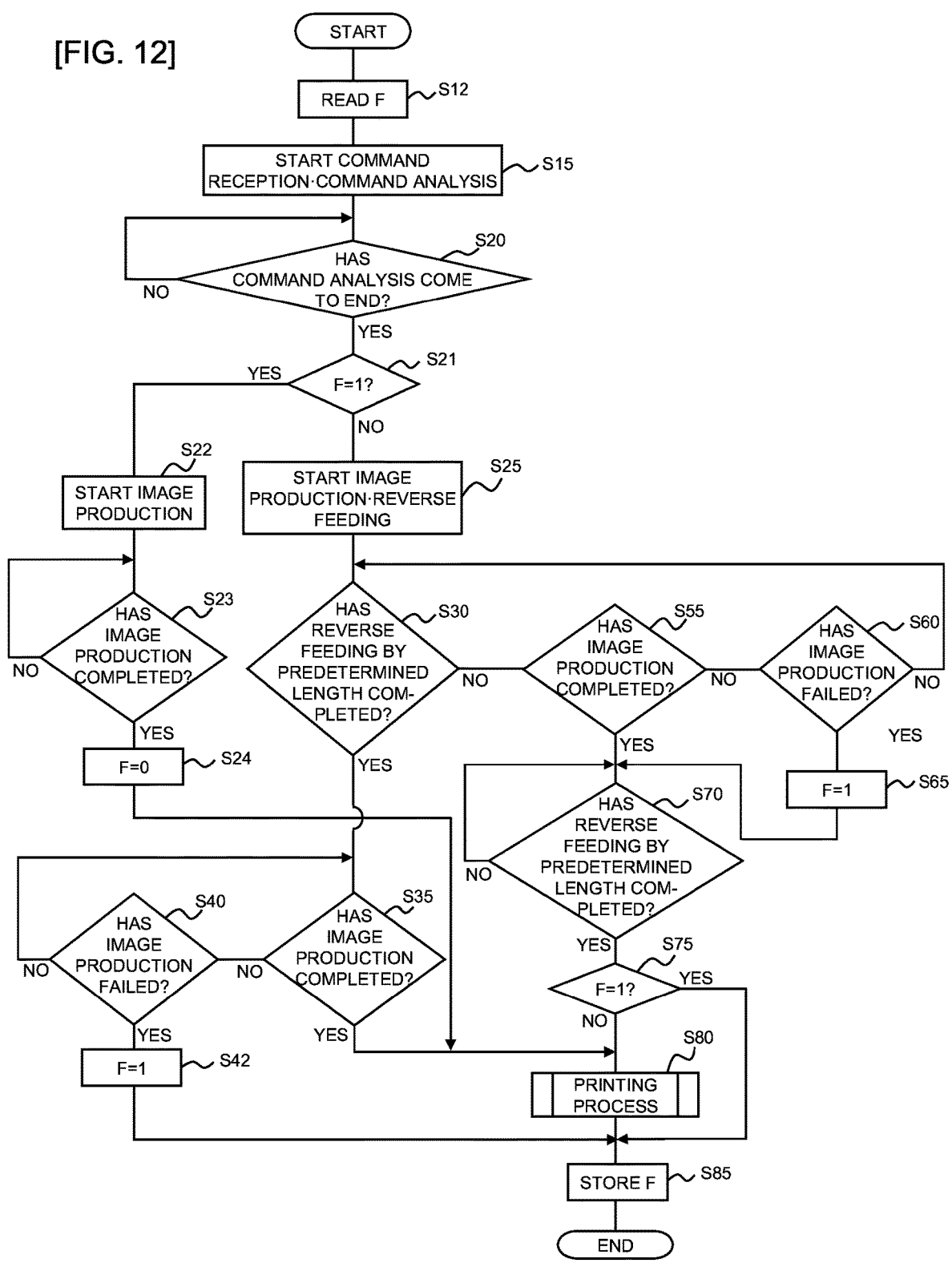
[FIG. 12]

PRINTER AND RECORDING MEDIUM

CROSS-REFERENCE TO RELATED APPLICATION

The present application claims priority from Japanese Patent Application No. 2016-194223, which was filed on Sep. 30, 2016, the disclosure of which is incorporated herein by reference in its entirety.

BACKGROUND

Field

The present disclosure relates to a printer executing a printing process that is triggered by reception of a print command, and a recording medium having a printing process program recorded thereon.

Description of the Related Art

A printer executing a printing process that is triggered by, for example, reception of a print command from an external operational terminal is known. This prior art printer, for example, first receives the print command (a reception process) and subsequently analyzes the print command (an analysis process). Image data in accordance with the result of the analysis is expanded in an image buffer (an image expansion process) and a print in accordance with the expanded image data is subsequently formed on a print-receiving medium (a print-receiving tape) (a printing process). The print-receiving medium having the print formed thereon is subsequently cut off by a cutter (a cutting blade) at a position upstream of a print area in a feeding direction. As a result, the cut-off print-receiving medium is separated from the rest to be a printed matter.

In this case, because the cutter is positioned downstream of a printing head in the feeding direction, after the cutting, the tip portion of the remaining print-receiving medium is position downstream of the printing head in the feeding direction and the portion of the print-receiving medium spanning from a position immediately close to the printing head to the tip portion is as it is a useless portion (on which no print can be formed). In the prior art, to avoid this, a reverse feeding process is executed before executing the printing process to move the tip of the print-receiving medium positioned in the vicinity of the cutting blade of the cutter by a predetermined distance in a reverse direction (that is reverse to the forward direction to be the ordinary feeding direction).

The processes in relation to the flow of the data of the above processes, that is, the reception process, the analysis process, the image expansion process, and the printing process need to be executed in this order, and none of these processes can be concurrently executed in parallel to any other process thereof. On the other hand, no such restriction is imposed on the reverse feeding process (that needs to necessarily be executed before the start of the printing process, though). Accordingly, when the reverse feeding process can concurrently be executed in parallel to any one of the processes that are executed before the printing process, not executing the reception process, the analysis process, the image expansion process, the reverse feeding process, and the printing process in this order as in the prior art, it is likely that the time period necessary for the overall processing up to the time when the reverse feeing process comes to an end can be reduced and a what-is-called throughput can be improved. Such a point is not considered in the prior art.

SUMMARY

An object of the present disclosure is to provide a printer that can reduce the time period necessary for the overall processing and a recording medium that has a printing process program recorded thereon.

In order to achieve the above-described object, according to the aspect of the present application, there is provided a printer comprising a feeder configured to feed a print-receiving medium in a forward direction and a reverse direction along a feeding path, a printing head configured to execute printing for a desired print area of the print-receiving medium fed by the feeder, a cutter that is disposed downstream of the printing head along the feeding path and is configured to cut off the print-receiving medium at a position upstream of a print area along the feeding path, the print-receiving medium having a print formed in the print area, an image buffer, a processor, and a memory, the memory storing computer-executable instructions that, when executed by the processor, cause the printer to perform a reception process for receiving a print command, an analysis process for analyzing the print command received by the reception process, an image expansion process for expanding image data corresponding to the print command analyzed by the analysis process in the image buffer, a reverse feeding process for controlling the feeder to feed the print-receiving medium in the reverse direction to move a tip of the print-receiving medium positioned in a vicinity of a cutting blade of the cutter by a predetermined distance in the reverse direction, and a printing process for controlling the feeder and the printing head to operate in cooperation with each other after the image expansion process and the reverse feeding process, to form a print on a basis of the image data expanded in the image buffer on the print-receiving medium, and the printer executing the image expansion process and the reverse feeding process in parallel to each other when the instructions are executed by the processor.

BRIEF DESCRIPTION OF THE DRAWINGS

FIG. 1 is a system configuration view showing a printing process system that includes a printer according to an embodiment of the present disclosure.

FIG. 2 is a perspective view showing a schematic configuration of the printer.

FIG. 3 is a perspective view showing the state of the printer where a top cover of a housing is removed, obliquely seen from above on the front side.

FIG. 4A is a cross-sectional view showing an F-F cross-section in FIG. 2.

FIG. 4B is a cross-sectional view showing a G-G cross-section in FIG. 2.

FIG. 5 is a functional block view showing the electrical configuration of the printer.

FIG. 6A is an explanatory view showing a behavior in accordance with a reveres feeding process.

FIG. 6B is an explanatory view showing a behavior in accordance with the reveres feeding process.

FIG. 6C is an explanatory view showing a behavior in accordance with the reveres feeding process.

FIG. 6D is an explanatory view showing a behavior in accordance with the reveres feeding process.

FIG. 7A is an explanatory view showing a flow of processes executed by a command processing part, an expansion control part, and a driving control part from reception of a print command to completion of a printing process, in Comparative Example.

FIG. 7B is an explanatory view showing a flow of the processes executed by the command processing part, the expansion control part, and the driving control part from the reception of the print command to the completion of the printing process, in an embodiment.

FIG. 8A is an explanatory view showing a flow of processes executed by the command processing part, the expansion control part, and the driving control part from the reception of the print command to the completion of the printing process, executed when a print length is short, in Comparative Example.

FIG. 8B is an explanatory view showing a flow of the processes executed by the command processing part, the expansion control part, and the driving control part from the reception of the print command to the completion of the printing process, executed when a print length is short, in the embodiment.

FIG. 9 is an explanatory view showing a flow of the processes executed by the command processing part, the expansion control part, and the driving control part from the reception of the print command to the completion of the printing process, executed when image expansion fails in the embodiment.

FIG. 10 is a flowchart showing control steps executed by a CPU of the printer.

FIG. 11 is an explanatory view showing a flow of the processes executed by the command processing part, the expansion control part, and the driving control part from the reception of the print command to the completion of the printing process, executed in a modification example where another form of processing is executed when production of image data fails.

FIG. 12 is a flowchart showing control steps executed by the CPU of the printer.

DESCRIPTION OF THE PREFERRED EMBODIMENTS

An embodiment of the present disclosure will be described with reference to the drawings.

<Printing Process System>

A printing process system including a printer of this embodiment will be described with reference to FIG. 1.

In FIG. 1, in a printing process system LS, an external terminal, for example, a personal computer 400 to operate a printer 1 (a printer) and the printer 1 that executes printing in accordance with a print command (including print data) received from the personal computer 400 are connected to each other by a universal serial bus (USB) cable 9.

The personal computer 400 is, for example, a multi-purpose personal computer that is generally available commercially, and includes a display part 401 such as a liquid crystal display, and an operational part 402 that includes a keyboard, a mouse, and the like. A USB port 419 (see FIG. 5 described later) to attach thereto and detach therefrom a connector 9H in one end portion of the USB cable 9 is disposed at a proper point (for example, in a back face portion) of the personal computer 400.

On a side face of the printer 1, a USB port 109 (see FIG. 5 described later) to attach thereto and detach therefrom a connector 9T in the other end portion on the side opposite to the side of the connector 9H of the USB cable 9 is disposed.

<Configuration of Printer>

The configuration of the printer 1 will be described with reference to FIG. 2 to FIG. 4. In FIG. 2 to FIG. 4, a lower right direction in FIG. 2 is defined as rightward, an upper left direction therein is defined as leftward, an upper right direction therein is defined as backward, a lower left direction therein is defined as frontward, an upward direction therein is defined as upward, and a downward direction therein is defined as downward (see arrows shown in each of FIG. 2 to FIG. 4).

As shown in FIG. 2 to FIG. 4, the printer 1 includes a substantially box-shaped housing 100 that constitutes the outer shell of the device. The housing 100 includes a top cover 101 that constitutes the upper portion of the outer shell of the device, and an under cover 2 that constitutes the lower portion of the outer shell of the device. The top cover 101 includes a fixed portion 101A and an opening and closing lid 101B.

A roll storage part 161 is disposed downward the opening and closing lid 101B of the top cover 101 (inside the housing 100) (see FIG. 3, FIG. 4). The roll storage part 161 has a roll paper sheet S stored therein with both end portions thereof axially supported rotatably by supporting members 162 (see FIG. 3) and, as a result, the roll paper sheet S (a print-receiving medium) can continuously be supplied from the roll storage part 161. In this case, the opening and closing lid 101B is rotatably coupled to a back end portion of the under cover 102 through a hinge part H, and the roll storage part 161 can be exposed to the exterior of the device to enable easy attachment or easy replacement of the roll paper sheet S by setting the opening and closing lid 101B to be opened. A discharging exit 107 to discharge the roll paper sheet S after the printing executed therefor is disposed in a substantially central portion of the top cover 101 in the front-back direction.

A platen roller 111 (a feeder; see FIG. 4) is rotatably supported in the end portion on the front side of the opening and closing lid 101B. The platen roller 111 feeds the roll paper sheet S when the opening and closing lid 101B is set to be closed as above.

For the roll paper sheet S fed as above, a desired print is formed by a thermal head 55 (a printing head; see FIG. 4) that is in contact with the platen roller 111 by a predetermined pressing contact force. In this case, a feeding motor 57 (see FIG. 5 described later) generating a driving force to drive and rotate the platen roller 111 (selectively in the forward direction or the reverse direction; the details thereof will be described later) is disposed inside the housing 100 and, when the opening and closing lid 101B is closed, the driving force of the feeding motor 57 is transmitted to the platen roller 111 by a gear mechanism not shown. The driving of the feeding motor 57 is controlled by a driving circuit 56 (see FIG. 5 described later) disposed on a control circuit board 170 (see FIG. 4A) arranged extending backward inside the housing 100. A battery power source storage part 163 (see FIG. 4A) into which a battery power source is inserted to be arranged therein from the lower face side of the under cover 102 is disposed downward the control circuit board 170 in the housing 100.

<Outlined Operation of Printer>

With the above configuration, when the printing is executed, the print command (including the print data) is transmitted by the personal computer 400 to the printer 1 through the USB cable 9 attached to the port 109 (see FIG. 3) disposed in the under cover 102. The roll paper sheet S in the roll storage part 161 is fed out by the rotation of the platen roller 111 on the basis of the driving force of the feeding motor 57. The fed-out roll paper sheet S is inserted between the thermal head 55 and the platen roller 111 to pass therethrough, and printing in the desired form on the basis of the print data is executed by the thermal head 55 for the roll paper sheet S. The roll paper sheet S after the printing is discharged from the discharging exit 107 to the exterior of the housing 100. A fixed blade 160 (a cutter) is disposed downstream of the thermal head 55 in the feeding path for the roll paper sheet S. In this case, the fixed blade 160 is attached to be along the discharging exit 107 inside the discharging exit 107 to a main chassis member 150 (see FIG. 3) disposed in the housing 100. A user can manually cut off the end portion of the roll paper sheet S whose printing is completed as above and that is discharged from the discharging exit 107, by holding the end portion with the user's hand, applying the end portion to the fixed blade 160, and pulling the end portion to fold back the end portion.

<Electrical Configuration of Printer>

The electrical configuration of the printer 1 will be described with reference to FIG. 5. As shown in FIG. 5, the printer 1 includes an input and output interface 31, a CPU 32 (a processor), a ROM 33, a RAM 34, and a flash.ROM 36.

The input and output interface 31 is connected to two driving circuits 54, 56, the USB port 109, the CPU 32, the ROM 33, the RAM 34, and the flash.ROM 36.

The driving circuit 54 is connected to the thermal head 55 and, when the print data is printed on the roll paper sheet S, drives the thermal head 55. The thermal head 55 includes plural heat generating elements that are arranged in a direction perpendicular to the feeding direction of the roll paper sheet S. The heat generating elements form dots in print lines each formed by dividing the roll paper sheet S at the print resolution in the feeding direction.

The driving circuit 56 is connected to the feeding motor 57 that is a pulse motor driving the platen roller 111 feeding the roll paper sheet S, and drives the feeding motor 57 when the roll paper sheet S is fed out to the exterior.

The connector 9T of the USB cable 9 is attached to the USB port 109 of the printer 1 and the personal computer 400 is thereby connected to the printer 1 through the USB cable 9.

The ROM 33 has various control programs relating to those other than the printing, and the like stored therein.

The RAM 34 has working areas disposed therein for the CPU 32 to execute the various control programs. For example, the RAM 34 has an image buffer 342 in which image data in accordance with the print command received from the personal computer 400 is expanded and a print data buffer 341 in which the print data in accordance with the image data expanded in the image buffer 342 is expanded, disposed therein. The "image data" as used herein refers to image data that is formed by, for example, bitmap-expanding the print content to be formed on a print-receiving medium (that is the roll paper sheet S in this example) and the "print data" as used herein includes data to control the energy to be energized to form the image data with high quality on the print-receiving medium (the roll paper sheet S in this example).

In this embodiment, the RAM 34 has the two of the image buffer 342 and the print data buffer 341 disposed therein to cope with the configuration not capable of setting the memory capacity to be large because of restrictions such as, for example, the device layout and the space (and to be able to execute the printing as quickly as possible even with the restrictions). The image data produced by analyzing (the details thereof will be described later) the print command received from the personal computer 400 is first expanded in the image buffer 342 and, on the other hand, the print data in accordance with the image data is produced and is expanded in the print data buffer 341. The thermal head 55 executes print formation referring to the print data in the print data buffer 341.

The flash.ROM 36 has a control program 37 relating to the printing (including a printing process program to execute the control content shown in, for example, FIG. 10, FIG. 12 described later), a management table 39, and the like, stored therein, and has a regular storage area 40 disposed therein. The regular storage area 40 has an application program storage area 41 and the like disposed therein.

The CPU 32 executes the programs described later with reference to FIG. 10 and FIG. 12, and the like. In this example, the CPU 32 functionally includes a command processing part 32A, an expansion control part 32B, and a driving control part 32C.

The command processing part 32A receives the print command transmitted from the personal computer 400, and interprets.analyzes the received print command in accordance with a known technique.

The expansion control part 32B expands the image data in accordance with the result of the analysis by the command processing part 32A in the image buffer 342 (the details thereof will be described later), produces the print data in accordance with the image data, and expands the print data in the print data buffer 341. The expansion control part 32B also determines whether the expansion of the image data in the image buffer 342 is successfully executed or fails (the details thereof will be described later).

The driving control part 32C executes printing for the roll paper sheet S using the thermal head 55 and using the print data expanded in the print data buffer 341 through the driving circuits 54, 56, and the like (the details thereof will be described later). The driving control part 32C also executes feeding of the roll paper sheet S in the reverse direction and subsequent feeding thereof in the forward direction through the driving circuit 54 (the details thereof will be described later).

In this embodiment having the above configuration, the thermal head 55 forms a print on the roll paper sheet S fed by the platen roller 111. In this case, the platen roller 111 and the thermal head 55 executes the printing on the basis of the control by each of the command processing part 32A, the expansion part 32B, and the driving control part 32C of the CPU 32.

<Reverse Feeding Process>

Triggered by the reception of the print command from the personal computer 400 (the details thereof will be described later), the printer 1 controls the platen roller 111 and the thermal head 55 to form the print in a print area P of the roll paper sheet S (see FIG. 6 and the like described later). The roll paper sheet S having the print formed thereon is subsequently cut off by the fixed blade 160 at a position upstream of the print area P in the feeding direction. As a result, the cut-off roll paper sheet S is separated from the rest and becomes a printed matter (for example, a print label).

In this case, as shown in FIG. 4, because the fixed blade 160 is positioned downstream of the thermal head 55 in the feeding direction, the tip portion of the roll paper sheet S remaining after the cutting is positioned downstream of the thermal head 55 in the feeding direction. As a result, the portion spanning from a position immediately close to the thermal head 55 to the tip portion is, as it is, a useless portion (in which no print can be formed) (see also FIG. 6 described later).

In this embodiment, to avoid the above, a reverse feeding process is executed in accordance with the control by the driving control part 32C of the CPU 32 before executing the printing process, to move the tip of the roll paper sheet S positioned in the vicinity of the fixed blade 160 by a predetermined distance in the reveres direction (that is reverse to the forward direction to be the ordinary feeding direction), to position the roll paper sheet S such that a tip Pa of the print area P faces the thermal head 55.

An example of the flow of the processes including the reverse feeding process executed in this embodiment will be described with reference to FIG. 6.

As shown in FIG. 6A, as to the roll paper sheet S left by the cutting for the production of the previous printed matter, a tip Sa thereof is located at the position of the fixed blade 160 and the tip Pa of the print area P protrudes toward the front side (on the left as shown) in the feeding direction from the position of the thermal head 55.

From this state, the roll paper sheet S is fed in the reverse direction (backward in the feeding direction and the rightward as shown) that is reverse to the forward direction (frontward in the feeding direction), and the feeding is discontinued when the tip Pa of the print area P arrives at the position of the thermal head 55 as shown in FIG. 6B to thereby complete the positioning of the roll paper sheet S relative to the thermal head 55.

Subsequently, as shown in FIG. 6C, the print is formed in the print area P by the thermal head 55 feeding the roll paper sheet S in the forward direction using the platen roller 111. As a result, as to the roll paper sheet S, the print can be formed from the tip portion of the print area P and the tip portion of the print area P is not wasted.

As shown in FIG. 6D, after the print is formed up to the back end of the print area P, the user cuts off the roll paper sheet S in the back end portion of the print area P using the fixed blade 160.

<Feature of this Embodiment>

As to the printer 1, for the printing process, after the print command is received, the print command is subsequently analyzed. The image data in accordance with the result of the analysis is expanded in the image buffer 342 and, in the subsequent printing process, the print in accordance with the expanded image data is formed on the roll paper sheet S. As described with reference to FIG. 6, the reverse feeding process is executed before the printing process. The feature of this embodiment is the timing at which the reverse feeding process is executed (the details thereof will be described later).

<Process Steps in Accordance with Comparative Example>

The flow of the above processes is executed in order of the reception process, the analysis process, the image expansion process, the reverse feeding process, and the printing process. The case where the processes are executed in this order will be described with reference to FIG. 7A as Comparative Example.

In Comparative Example shown in FIG. 7A, as to the printer 1, when the command processing part 32A receives the print command transmitted from the personal computer 400 (=the reception process, see a time to), the command processing part 32A starts the analysis of the received command (=the command analysis process). When the analysis of the command is completed (see a time t1), the expansion control part 32B starts production of the image data in accordance with the result of the analysis and expansion thereof in the image buffer 342 (=the image expansion process).

When the image expansion process is subsequently completed (see a time t2), the roll paper sheet S is fed by a predetermined length in the reverse direction in accordance with the control by the driving control part 32C of the CPU 32 (=the reverse feeding process), and the positioning of the roll paper sheet S relative to the thermal head 55 is completed (see a time t3). When the positioning is completed, the formation of the print on the basis of the produced image data with the roll paper sheet S being fed in the forward direction is started (=the printing process), and the formation of the print subsequently comes to an end at a time t4. As a result, a series of process steps from the command reception to the end of the print formation is completed.

<Problems of Comparative Example>

Of the processes shown in FIG. 7A, the processes related to the flow of the data, that is, the reception process, the analysis process, the image expansion process, and the printing process need to be sequentially executed in this order, and any one of these processes cannot be concurrently executed in parallel to any other process thereof. On the other hand, no such restriction is imposed on the reverse feeding process (though the reverse feeding process needs to necessarily be executed before the start of the printing process). The time period necessary for the overall processing up to the end of the printing process can necessarily be reduced and a what-is-called throughput can necessarily be improved when the reverse feeding process can concurrently be executed in parallel to any one process that is executed before the printing process, not executing the processes in order of the reception process, the analysis process, the image expansion process, the reverse feeding process, and the printing process (in other words, standing by without executing the reverse feeding until the production of image is completed) as in Comparative Example.

<Process Steps in Accordance with Embodiment>

In this embodiment, the reverse feeding process is concurrently executed in parallel to the image expansion process. This technique will be described with reference to FIG. 7B.

In FIG. 7B, similarly to Comparative Example, when the command processing part 32A receives the print command (=the reception process, see the time to), the command processing part 32A starts the command analysis process. When the command analysis is completed (see the time t1), similarly to Comparative Example, the expansion control part 32B starts the image expansion process for the image buffer 342 and, substantially simultaneously therewith (including the case where a slight difference in the timing is present in the electronic control processing, in addition to the case of "completely simultaneously"), in this embodiment, the driving control part 32C starts the reverse direction feeding of the roll paper sheet S (in parallel to the image expansion process). Subsequently, when the reverse direction feeding (=the reverse feeding process) by the predetermined length same as that in FIG. 7A comes to an end, the positioning of the roll paper sheet S relative to the thermal head 55 is completed (see a time t3'). In this example, t3'−t1=t3−t2.

When the image expansion process executed by the expansion control part 32B and started at the time t1 is subsequently completed (see the time t2), similarly to FIG. 7A, the driving control part 32C starts the formation of the print on the basis of the produced image data (=the printing process) feeding the roll paper sheet S in the forward direction and the formation of the print subsequently comes to an end at a time t4'. In this example, t4'−t2=t4−t3. As a result, the series of process steps from the reception of the command to the end of the print formation is completed.

<Example of Case where Print Length is Short and Image Expansion Process Needs Short Time Period>

With reference to FIG. 7A and FIG. 7B, the description has been made taking an example of the case where the length of the print on the roll paper sheet S is an ordinary length (or a relatively long length). In contrast, the behavior in accordance with Comparative Example and the behavior in accordance with the embodiment each in the case where the length of the print on the roll paper sheet S is relatively short will be described with reference respectively to FIG. 8A and FIG. 8B.

<Process Steps in Accordance with Comparative Example>

In Comparative Example shown in FIG. 8A, similarly to FIG. 7A, when the print command is received (=the reception process, see the time to), the command analysis process is started. When the command analysis is completed (see the time t1), the image expansion process for the image buffer 342 is started and, when the image expansion process is completed (see the time t2), the reverse feeding process is started. When the reverse feeding by the predetermined length is executed to complete the positioning of the roll paper sheet S (see the time t3), the printing process is started and the printing process subsequently comes to an end at the time t4. As a result, the series of process steps from the reception of the command to the end of the print formation is completed.

In this case, the length of the image data to be produced is short because of the short print length, and the time period necessary for the image expansion process (t2−t1) is reduced relative to that of the case shown in FIG. 7A.

<Process Steps in Accordance with Embodiment>

In this embodiment shown in FIG. 8B, similarly to FIG. 7B, when the print command is received (=the reception process, see the time to), the command analysis process is started and, when the command analysis is completed (see the time t1), similarly to the above, the image expansion process is started and, substantially simultaneously therewith, the reverse feeding process is started.

In this case, because the length of the image data to be produced is short and the time period (t2−t1) necessary for the image expansion process is shorter than the time period (t3'−t1) necessary for the reverse feeding process as above, the image expansion process comes to an end at the time t2 (before the reverse feeding process) and, subsequently, the reverse feeding process for the predetermined length is completed (see the time t3'). In this case, as above, t3'−t1=t3−t2.

After the reverse feeding process comes to an end, similarly to the above, the printing process is started and the print formation comes to an end at the time t4'. In this case, t4'−t3'=t4−t3. As a result, the series of process steps from the reception of the command to the end of the print formation is completed.

<When Image Production Fails>

In this embodiment, as above, on the premise of the flow of the processes of the reception process, the analysis process, the image expansion process, and the printing process (on the premise of smooth execution of the processes up to the printing process), the reverse feeding process is executed in parallel to the image expansion process. In this case, however, the possibility that the expansion of the image data in the image buffer 342 in the image expansion process fails due to a certain cause (such as, for example, exceeding the capacity of the image buffer 342 in the course of the process, or the like) is not zero and, in such a case, the printing process to be executed after the image expansion process is not executed.

The flow of the processes in this embodiment executed in the case where the image production fails as above will be described with reference to FIG. 9 that corresponds to FIG. 7B.

In FIG. 9, similarly to FIG. 7B, when the print command is received (=the reception process, see the time to), the command analysis process is started. When the command analysis is completed (see the time t1), the image expansion process is started for the image buffer 342 and, substantially simultaneously therewith, the reverse feeding process is started and, similarly to the above, the reverse feeding process comes to an end at the time t3'.

In this case, when the production of the image data in the image expansion process started at the time t1 fails for a certain cause (see the time t5), in this embodiment, because the reverse feeding process already comes to an end (see FIG. 6B), to return this to the previous state thereof, the roll paper sheet S is fed in the forward direction by the same length as that of the reverse feeding (that is, the predetermined length) in accordance with the control by the driving control part 32C (see a time t6). As a result, the roll paper sheet S can be returned to be in the state where the tip Sa is positioned in the vicinity of the fixed blade 160 (before the reverse feeding) (see FIG. 6A). The printing process to be executed subsequently to the image expansion process is not executed because of the failure in the production of the image data.

On the other hand, when the print command is newly received subsequently, similarly to the above, the same processes as the command reception and those thereafter are repeated. When the print command (to which proper processes are applied in advance such as, for example, compression.division and the like coping with the failure in the production of the image data) is again received by the command processing part 32A (see a time t10), the command processing part 32A starts the command analysis process that is same as above and, when the command analysis is completed (see a time t11), the expansion control part 32B starts the image expansion process for the image buffer 342 and, simultaneously, the driving control part 32C starts the reverse feeding process. When the reverse direction feeding by the predetermined length comes to an end (see a time t13'), the positioning is completed. In this example, t13'−t1=t3'−t1.

When the image expansion process executed by the expansion control part 32B and started at the time t11 is subsequently completed (see a time t12), the printing process same as above is started and the printing process subsequently comes to an end at a time t14'. As a result, the series of process steps from the re-reception of the command to the end of the printing is completed.

<Control Steps>

Control steps executed by the command processing part 32A, the expansion control part 32B, and the driving control part 32C of the CPU 32 to realize the above technique will be described with reference to a flowchart in FIG. 10.

In FIG. 10, at step S10, the CPU 32 first initializes an image production failure flag F to be F=0. When step S10 comes to an end, the control step moves to step S15.

At step S15, the CPU 32 receives the print command transmitted from the personal computer 400 using the command processing part 32A, and starts the analysis of the received command. The control step subsequently moves to step S20.

At step S20, the CPU 32 determines whether the analysis of the command comes to an end, using the command processing part 32A. When the analysis of the command does not yet come to an end, the determination at step S20 is not satisfied (S20:NO), loop-standing-by is executed for step S20 until the analysis comes to an end. When the analysis of the command comes to an end, the determination at step S20 is satisfied (S20: YES), the control step moves to step S25.

At step S25, the CPU 32 starts the production of the image data in accordance with the result of the analysis of the command at step S15-step S20 and expansion thereof in the image buffer 342 (hereinafter, properly referred to simply as "production of image data"), using the expansion control part 32B. The CPU 32 substantially simultaneously therewith causes the feeding motor 57 to drive the platen roller 111, using the driving control part 32C, to start the feeding of the roll paper sheet S in the reverse direction. The control step subsequently moves to step S30.

At step S30, the CPU 32 determines whether the reverse direction feeding by the predetermined length (necessary to position the roll paper sheet S relative to the thermal head 55) is executed from the start of the reverse direction feeding executed at step S25, using the driving control part 32C. The determination on this feeding distance is successfully executed when the determination is executed using a proper known technique of, for example, counting the number of pulses output by the driving circuit 56 driving the feeding motor 57 that is a pulse motor at and after the timing of step S20 and determining whether the counted number reaches a predetermined value that corresponds to the predetermined distance. Otherwise, whether a predetermined time period elapses from the start of the reverse direction feeding may be determined.

The determination executed at step S30 is not satisfied until the reverse direction feeding by the predetermined length is completed (S30:NO) and the control step moves to step S55.

At step S55, the CPU 32 determines whether the production of the mage data started at step S25 is completed, using the expansion control part 32B. The determination executed at step S55 is not satisfied until the production of the image data is completed (S55:NO) and the control step moves to step S60.

At step S60, the CPU 32 determines whether the production of the image data fails, using the expansion control part 32B. The determination executed at step S60 is not satisfied during continuous execution of the production of the image data without any particular failure (S60:NO) and the control step returns to step S30 to repeat the same steps.

When the reverse direction feeding of the roll paper sheet S by the predetermined length is completed during the repetition of the flow of step S30, step S55, step S60, step S30, and so on as above, the determination executed at step S30 is satisfied (S30: YES) and the control step moves to step S35.

At step S35, the CPU 32 determines whether the production of the image data started at step S25 is completed, using the expansion control part 32B. The determination executed at step S35 is not satisfied until the production of the image data is completed (S35:NO) and the control step moves to step S40.

At step S40, the CPU 32 determines whether the production of the image data fails. The determination executed at step S40 is not satisfied during the continuous execution of the production of the image data without any particular failure (S40:NO) and the control step returns to step S35 to repeat the same steps.

In this manner, when the production of the image data is completed during the repetition of the flow of step S35, step S40, step S35, and so on (see FIG. 7B), the determination executed at step S35 is satisfied (S35: YES), and the control step moves to step S80.

At step S80, the CPU 32 outputs a control signal to the driving circuit 54 and outputs a control signal to the thermal head 55, using the driving control part 32C. As a result, the feeding motor 57 drives the platen roller 111 to feed the roll paper sheet S in the forward direction and print formation (=the printing process) on the basis of the produced image data in the print area F of the roll paper sheet S is concurrently executed by the thermal head 55 (see FIG. 7B). The roll paper sheet S having the print formed thereon is subsequently cut off by the user using the fixed blade 160 at a position upstream of the print area P in the feeding direction, and the printed matter is produced. When the processing at step S80 comes to an end, this flow is subsequently caused to come to an end.

On the other hand, when the production of the image data fails during the repetition of the flow of step S35, step S40, step S35, and so on as above (see FIG. 9), the determination executed at step S40 is satisfied (S40: YES), and the control step moves to step S45.

At step S45, the CPU 32 outputs a control signal to the driving circuit 54 to cause the feeding motor 57 to drive the platen roller 111 to start feeding of the roll paper sheet S in the forward direction, using the driving control part 32C. The control step subsequently moves to step S50.

At step S50, the CPU 32 determines whether forward direction feeding by the predetermined length (necessary for returning to the previous state before the reverse feeding of the roll paper sheet S) is executed from the start of the forward direction feeding executed at step S45, using the driving control part 32C. This determination is successfully executed when the determination is executed using the same technique as that used at step S30. The determination at step S50 is not satisfied until the forward direction feeding by the predetermined length is completed (S50:NO) and loop-standing-by is executed. When the forward direction feeding by the predetermined length is completed, the determination executed at step S50 is satisfied (S50: YES). In this state, the tip Sa of the roll paper sheet S is returned to the previous state thereof where the tip Sa is positioned in the vicinity of the fixed blade 160 (see FIG. 6A and FIG. 9). When the processing executed at step S50 comes to an end, this flow is subsequently caused to come to an end.

On the other hand, when the production of the image data is completed during the repetition of the flow of step S30, step S55, step S60, step S30, and so on as above (before the reverse direction feeding of the roll paper sheet S by the predetermined length is completed) (see FIG. 8B), the determination executed at step S55 is satisfied (S55: YES), and the control step moves to step S70.

At step S70, the CPU 32 determines whether the reverse direction feeding by the predetermined length is executed using the technique same as that used at step S30, using the driving control part 32C. The determination executed at step S70 is not satisfied until the reverse direction feeding by the predetermined length is completed (S70:NO) and loop-standing-by is executed. When the reverse direction feeding by the predetermined length is completed, the determination executed at step S70 is satisfied (S70: YES) and the control step moves to step S75.

At step S75, the CPU 32 determines whether the flag F is F=1 at this time point, using the driving control part 32C. When the production of the image is completed as above (different from step S65 described later), the flag is still F=1 and, as a result, the determination executed at step S75 is not satisfied (S75:NO) and the control step moves to step S80. After the printing process is executed as above by the driving control part 32C, this flow is caused to come to an end.

On the other hand, when the production of the image data fails (before the reverse direction feeding of the roll paper sheet S by the predetermined length is completed) during the repetition of the flow of step S30, step S55, step S60, step S30, and so on as above, the determination executed at step S60 is satisfied (S60: YES), and the control step moves to step S65.

At step S65, the CPU 32 sets the flag F to be F=1 that corresponds to the failure of the production of the image data, using the expansion control part 32B. When the processing executed at step S65 comes to an end, the control step moves to step S70 at which the execution of the reverse direction feeding by the predetermined length by the driving control part 32C is waited for, and the control step subsequently moves to step S75 described above.

At step S75 to which the control step moves as above, the determination is satisfied because the flag F is F=1 (S75: YES) and the control step moves to step S45 described above.

At step S45, as above, the CPU starts the forward direction feeding of the roll paper sheet S using the driving control part 32C, subsequently waits for the forward direction feeding by the predetermined length to be executed at step S50, and subsequently causes this flow to come to an end.

Of the steps shown in the flow in FIG. 10, the steps of step S40 and step S60 correspond to the determination process described in the appended claims.

The present disclosure is not limited to the embodiment and various modifications can be made thereto within the scope not departing from the gist and the technical idea thereof. Such modification examples will sequentially be described below.

(1) Feeding Distance Used in Reverse Feeding Process is Set to be Variable

The predetermined length (the feeding distance for the reverse feeding) used in the reverse feeding process may be set to be variable using the print command. This case has the following meaning.

In this case, the predetermined length used in the reverse feeding process is set to be variable in accordance with the print command (for example, in accordance with, for example, the various settings included in the print command such as, for example, a setting of the size of the margin of the print area P) in the form that utilizes the fact that the reverse feeding process is not executed concurrently with the analysis process (that is executed before the execution of the image expansion process) as above.

(2) Another Processing Form Employed for Failure of Production of Image Data

The state of the roll paper sheet S is returned to its previous state before the roll paper sheet S is reversely fed, by feeding the roll paper sheet S in the forward direction by the distance that is equal to the length fed in the reverse feeding process concurrently executed in parallel to the production of the image data when the production of the image data fails in the embodiment while the returning of the state is not limited to this. The forward feeding may not be executed and the state where the reverse feeding is executed may be maintained to be utilized in the processes executed when the command is subsequently received again and thereafter. Such a modification example will be descried below with reference to FIG. 11 and FIG. 12.

FIG. 11 is an explanatory view showing the flow of the processes from the reception of the print command to the completion of the printing process in this modification example, corresponding to FIG. 9 of the embodiment.

As shown in FIG. 11, in this modification example, the concurrent execution of the reception of the command and the command analysis (the times to-t1) by the command processing part 32A, the production of the image data and the start of the expansion thereof by the expansion control part 32B, and the reverse feeding process (see the times t1-t3') by the driving control part 32C in parallel to each other is same as that in FIG. 9. When the production of the image data started at the time t1 fails as above (see the time t5), the roll paper sheet S is left reversely fed without executing the forward feeding to return the state of the roll paper sheet S to its previous state (see a frame of a chain double-dashed line of the times t5-t6) as in FIG. 9.

When the new print command is subsequently received by the command processing part 32A (see the time t10) as described with reference to FIG. 9, the command analysis process is executed by the command processing part 32A similarly to the above (see the times t10-t11). When the command analysis process comes to an end (the time t11), in this modification example, the production (the expansion) of the image data for the image buffer 342 is started by the expansion control part 32B similarly to that in FIG. 9. In this modification example, however, because, at this time point, the roll paper sheet S is left reversely fed as is at the time when the image data production fails and is not returned to the previous state thereof as above, the length reversely fed is utilized and no reverse feeding after the re-reception is executed.

The processes subsequently executed at the time when the production of the image data is completed (the time t12) and thereafter are same as those in FIG. 9 and will not again be described.

<Control Steps>

The control steps executed by the command processing part 32A, the expansion control part 32B, and the driving control part 32C of the CPU 32 in this modification example to realize the above technique will be described with reference to a flowchart in FIG. 12. In the flow shown in FIG. 12, step S12 is provided instead of step S10, step S21 is newly provided between step S20 and step S25, step S22, step S23, and step S24 branching from step S21 are newly provided before step S80, and step S85 that is a new step is provided after step S80 in the flowchart in FIG. 10. Step S45, step S50 in FIG. 10 are not executed, and step S42 is newly provided between step S40 and step S85 that is the new step.

In this modification example, the value of the image production failure flag F is stored in a proper point (for example, the flash.ROM 36) every time the flow is executed (see step S85 described later). In FIG. 12, at step S12 that is newly provided, the CPU 32 reads the value of the flag F stored in the flash.ROM 36 using the command processing part 32A (in the initial state where this flow is not executed even once, the value of the flag F is initialized to be 0).

When the process at step S12 comes to an end, the control step moves to step S21 that is newly provided, through the print command reception and the print command analysis executed at step S15 and step S20 same as those in FIG. 10.

At step S21, the CPU 32 determines whether the value of F read at step S12 is 1, using the expansion control part 32B. When no history of any image production failure is present at this time point, F is still F=0 and, as a result, the determination is not satisfied (S21:NO), the control step moves to step S25.

The control step subsequently moves to step S30 same as that in FIG. 10 through the production of the image data, the expansion thereof in the image buffer 342, and the start of the reverse direction feeding at step S25 same as that in FIG. 10.

The determination of the reverse direction feeding by the predetermined length at step S30 and the subsequent repetition of the flow of step S30, step S55, step S60, step S30, and so on are same as those in FIG. 10. When the reverse direction feeding by the predetermined length is completed and the determination executed at step S30 is satisfied during this repetition, the control step moves to step S35 same as that in FIG. 10.

The completion of the production of the image data at step S35 and the subsequent repetition of the flow of step S35, step S40, step S35, and so on are same as those in FIG. 10. When the production of the image data is completed and the determination executed at step S35 is satisfied during this repetition, the control step moves to step S80 same as that in FIG. 10 and the printing process is executed. This flow is subsequently caused to come to an end through step S85 (in accordance with the above flow, the value of F that is F=0 is stored at step S85 in this case).

On the other hand, when the production of the image data fails during the repetition of the flow of step S35, step S40, step S35, and so on (see FIG. 11), the determination executed at step S40 is satisfied (S40: YES) and the control step moves to step S42 that is newly provided.

At step S42, the CPU 32 sets the image production failure flag F to be F=1 and stores this value at step S85 using the expansion control part 32B, and subsequently causes this flow to come to an end.

On the other hand, when the production of the image data is completed and the determination executed at step S55 is satisfied during the repetition of the above flow of step S30, step S55, step S60, step S30, and so on, the control step moves to step S70 same as that in FIG. 10. The completion of the reverse feeding by the predetermined length is subsequently waited for at step S70 and, when no history of any image production failure is present at this time point, F is still F=0. As a result, the determination is not satisfied (S75:NO) and the printing process is executed at step S80 similarly to that in FIG. 10 and this flow is subsequently caused to come to an end through step S85 (in accordance with the above flow, the value of F that is F=0 is stored at step S85 in this case).

On the other hand, when the production of the image data fails during the repetition of the above flow of step S30, step S55, step S60, step S30, and so on, the image expansion failure flag F is set to be "1" at step S65, the completion of the reverse feeding by the predetermined length is waited for at step S70, and the control step moves to step S75, similarly to those in FIG. 10. In this case, F is F=1 because of the failure of the image production at this time point and, as a result, the determination executed at step S75 is satisfied (S75: YES) while, in this flow, this flow is caused to come to an end as it is through step S85 without executing the forward feeding at step S45 as that in FIG. 10 (see the times t5-t6 in FIG. 11) (in accordance with the above flow, the value of F that is F=1 is stored at step S85 in this case).

As described taking the example in the above flow, in the state where the production of the image data fails and the value of the flag F that is F=1 is stored, when the production of the printed matter is subsequently started newly and this flow is started, the value of the flag (F=1) is read at step S12 and, through the reception of the new print command and the analysis thereof executed at step S15 and step S20, the determination executed at step S21 is subsequently satisfied. As a result, the control step moves to step S22 that is newly provided.

At step S22, similarly to step S25, the CPU 32 starts the production of the image data in accordance with the result of the command analysis and the expansion thereof in the image buffer 342 executed at step S15-step S20, using the expansion control part 32B.

At step S23, similarly to step S55, the CPU 32 subsequently determines whether the production of the image data started at step S25 is completed, using the expansion control part 32B. When the production of the image data is completed, the determination executed at step S23 is satisfied (S23: YES) and the control step moves to step S24.

At step S24, the CPU 32 sets back the image expansion failure flag F to be F=0 using the expansion control part 32B and the control step moves to step S80. In this manner, in the case where, after the production of the image data fails once and the F is F=1, the flow is executed again, the printing process is executed at step S80 in this state without executing again the reverse feeding as executed in FIG. 9 (see the times t11-t13').

As above, in this modification example, whether the expansion of the image data in the image expansion process is successfully executed or fails is determined (see step S40 and step S60). When it is determined that the expansion of the image data in the image buffer 342 is successfully executed, the printing process on the basis of the expanded image data is executed (step S35 to step S80, or step S55 to step S70 to step S75 to step S80). On the other hand, in the case where it is determined that the expansion of the image data in the image buffer 342 fails, after the image expansion failure flag F is set to be 1 and is stored, when the processes are executed again (when the flow is newly executed again), only the reception process, the analysis process in accordance therewith, the image expansion process in accordance therewith, and the printing process in accordance therewith are newly executed, and the above forward direction process as that in the embodiment is not executed (see the times t5-t6).

(3) Others

In the above, the description has been made taking the example of the case where the user holds the end portion of the roll paper sheet S for which the printing is completed and that is discharged, with the user's hand and manually cuts off the end portion using the fixing blade 160 as the cutter, while the cutting is not limited to this. The present disclosure may be applied to a configuration to cut off the print-receiving medium (that is the roll paper sheet S in this example) using a cutting blade as the cutter that is properly driven by an actuator such as a solenoid.

In the above description, when descriptions such as "perpendicular", "parallel", "a plane", and the like are present, the descriptions each have no strict meaning. These "perpendicular", "parallel", and "a plane" respectively mean "substantially perpendicular", "substantially parallel", and "substantially a plane" each allowing the tolerance and the error relating to the design and the production.

In the above, when descriptions such as "same", "equal", "different", and the like are present for the dimensions and the size of the outer appearance, the descriptions each have no strict meaning. These "same", "equal", and "different" respectively mean "substantially same", "substantially equal", and "substantially different" each allowing the tolerance and the error relating to the design and the production.

In the above, arrows shown in FIG. 5 each indicate an example of the flow of the signal and each do not limit the direction of the flow of the signal.

The flowcharts shown in FIG. 10, FIG. 12 each do not limit the present disclosure to the steps shown in these flows, and any addition.deletion to/from, any change of order, or the like of the steps may be made within the scope not departing from the gist and the technical idea of the present disclosure.

In addition to the above, the techniques in accordance with the embodiment and the modification examples may be used properly in combination.

In addition, though not specifically exemplified, the present disclosure is implemented with various changes made thereto within the scope not departing from the gist thereof.

What is claimed is:

1. A printer comprising:
a feeder configured to feed a print-receiving medium in a forward direction and a reverse direction along a feeding path;
a printing head configured to execute printing for a desired print area of said print-receiving medium fed by said feeder;
a cutter that is disposed downstream of said printing head along said feeding path and is configured to cut off said print-receiving medium at a position upstream of a print area along said feeding path, said print-receiving medium having a print formed in said print area;
an image buffer;
a processor; and
a memory;
said memory storing computer-executable instructions that, when executed by said processor, cause said printer to:
receive a print command;
analyze said received print command;
expand image data corresponding to said analyzed print command in said image buffer;
control said feeder to feed said print-receiving medium in said reverse direction to move a tip of said print-receiving medium positioned in a vicinity of a cutting blade of said cutter by a predetermined distance in said reverse direction; and
control said feeder and said printing head to operate in cooperation with each other after expanding image data corresponding to said analyzed print command and controlling said feeder to feed said print-receiving medium in said reverse direction to form a print on a basis of said image data expanded in said image buffer on said print-receiving medium, and
execute expanding image data corresponding to said analyzed print command and controlling said feeder to feed said print-receiving medium in said reverse direction in parallel to each other when said instructions are executed by said processor.

2. The printer according to claim 1, wherein the processor is further configured to move
said tip of said print-receiving medium positioned in the vicinity of said cutting blade of said cutter in said reverse direction to position said print-receiving medium such that the tip of said print area faces said printing head.

3. The printer according to claim 1, further comprising a print data buffer, wherein the processor is further configured to produce
print data corresponding to said image data expanded in said image buffer to be expanded in said print data buffer, and the processor is further configured to form said print by referring to said print data expanded in said print data buffer.

4. The printer according to claim 1, wherein
when said processor executes said instructions, and substantially simultaneously expands image data corresponding to said analyzed print command in said image buffer and controls said feeder to feed said print-receiving medium in said reverse direction.

5. The printer according to claim 1, wherein
said memory stores instructions that, when executed by said processor, cause said printer to further:
determine whether expansion of said image data in said image buffer is successfully executed or fails, and wherein
when said instructions are executed by said processor, in the case that it is determined that the expansion of said image data in said image buffer is successfully executed, said printer executes printing on a basis of said expanded image data, and in the case that it is determined that the expansion of said image data in said image buffer fails, said printer feeds said print-receiving medium in said forward direction to move the tip of said print-receiving medium by said predetermined distance in said forward direction for said tip to be positioned in the vicinity of said cutting blade, and
after said printer feeds said print-receiving medium in said forward direction, said processor newly receives the print command, analyzes said received print command, expands image data corresponding to said analyzed print command, controls said feeder to feed said print-receiving medium in said reverse direction and controls said feeder and said printing head to operate in cooperation with each other to form the print.

6. The printer according to claim 1, wherein
said memory stores instructions that, when executed by said processor, cause said printer to further:
determine whether expansion of said image data in said image buffer is successfully executed or fails, and wherein
when said instructions are executed by said processor, in the case that it is determined that the expansion of said image data in said image buffer is successfully executed, said printer executes printing on a basis of said expanded image data, and in the case that it is determined that the expansion of said image data in said image buffer fails, said processor newly receives the print command, analyzes said received print command, expands image data corresponding to said analyzed print command, and controls said feeder and said printing head to operate in cooperation with each other to form the print.

7. The printer according to claim 1, wherein
said predetermined distance is set to be variable by said print command.

8. A non-transitory computer-readable recording medium, storing a printing process program to be readable for a computing device, for executing steps on the computing device provided in a printer that comprises a feeder configured to feed a print-receiving medium in a forward direction and a reverse direction along a feeding path; a printing head configured to execute printing for a desired print area of said print-receiving medium fed by said feeder; a cutter that is disposed downstream of said printing head along said feeding path and is configured to cut off said print-receiving medium at a position upstream of a print area along said feeding path, said print-receiving medium having a print formed in said print area; and an image buffer, said steps comprising:

receiving a print command;
 analyzing said print command received;
 expanding image data corresponding to said analyzed print command in said image buffer;
 controlling said feeder to feed said print-receiving medium in said reverse direction to move a tip of said print-receiving medium positioned in a vicinity of a cutting blade of said cutter by a predetermined distance in said reverse direction; and
 controlling said feeder and said printing head to operate in cooperation with each other after expanding image data corresponding to said analyzed print command and controlling said feeder to feed said print-receiving medium in said reverse direction, to form a print on a basis of said image data expanded in said image buffer on said print-receiving medium, and wherein
 said expanding image data corresponding to said analyzed print command and controlling said feeder to feed said print-receiving medium in said reverse direction are concurrently executed in parallel to each other.

* * * * *